July 21, 1970  T. K. SEN  3,521,102
MOUNTING FOR AN ELECTRICAL CONTACT BRUSH
Filed Aug. 18, 1969
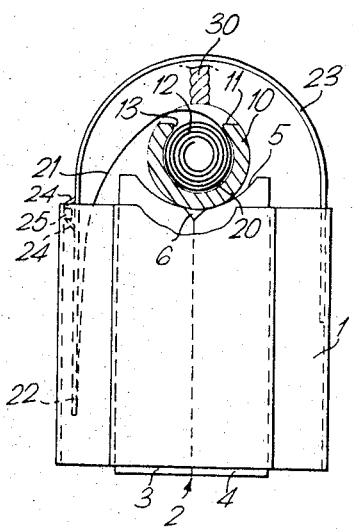
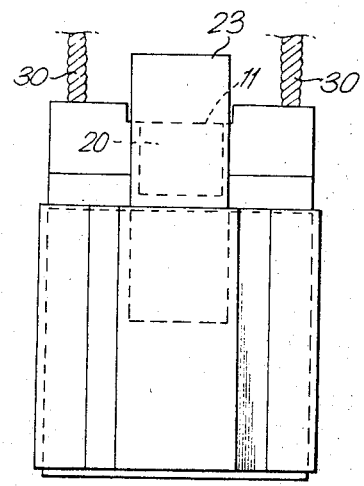
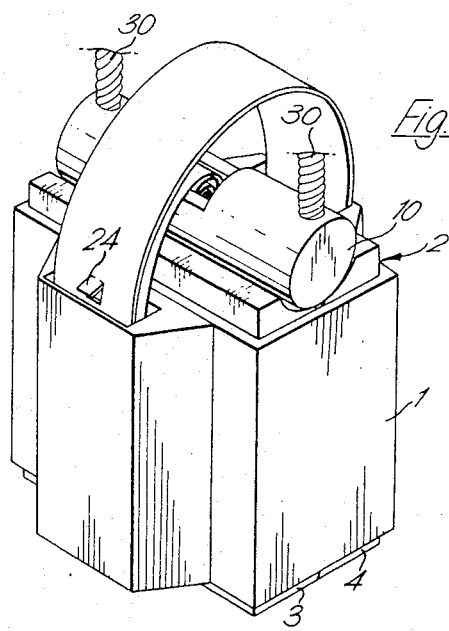
Inventor
Timir Kumar Sen
By Cushman, Darby & Cushman
Attorneys United States Patent Office 3,521,102
Patented July 21, 1970

3,521,102
MOUNTING FOR AN ELECTRICAL CONTACT BRUSH
Timir Kumar Sen, London, England, assignor to Morganite Carbon Limited, London, England, a corporation of the United Kingdom
Filed Aug. 18, 1969, Ser. No. 850,921
Claims priority, application Great Britain, Aug. 23, 1968, 40,542/68
Int. Cl. H02k 13/00
U.S. Cl. 310—246                    17 Claims

ABSTRACT OF THE DISCLOSURE

An electrical contact brush mounting including a contact member bearing against the brush received in a brush box. The contact member has a cavity retaining the coiled end of a constant force coil spring, an outer extending end of the spring being fixed relative the brush box whereby the brush is urged through the brush box by the spring bias.

BACKGROUND OF THE INVENTION

This invention relates to a mounting for an electrical contact brush. The mounting is particularly useful when associated with a commutator or slip ring, wherein a brush held in the mounting is urged into contact with the commutator or slip ring.

In prior art contact brush mountings, a biasing member directly contacts the end of a brush, or the ends of 2, 3, 4 or more split brushes, the biasing member urging the brush or brushes through a brush box. A principal disadvantage of such an arrangement is that relatively high pressure is exerted by the end of the biasing member on the brush or brushes at the point of contact. This is more serious with, for example, four thin split brushes than with a single brush. An inherent disadvantage is that it is usually necessary to fix a flexible electric lead to the brush or brushes to carry current thereto.

In the present invention, abutment means in the form of a hollow electrical contact is used to bear against the end of the brush, or more usefully against the ends of a plurality of split brushes, thereby spreading the biasing force more evenly over the brush end or ends. The hollow electrical contact member retains the coiled end of a constant force spring for biasing the contact member onto the brush end or ends. In a particular arrangement it is possible to use flexless brushes, electrical contact being made by the contact member to which flexible electric leads are attached. The provision of a mounting in which flexible brush leads are attached to brush abutment means, and not to the brushes, enables easier and more economic manufacture of the brushes, and easier fitting of the brushes in their mounting either initially, or for replacement purposes.

Accordingly, it is an object of the invention to provide an electrical brush mounting in which a more even biasing force is exerted on the end of a brush, or ends of brushes, retained in the mounting.

It is a further object of the invention to provide an electrical brush mounting adapted to receive either a single brush, or a plurality of split brushes without flexible electric leads, thereby enabling easier fitting and easier manufacture of brushes.

SUMMARY OF THE INVENTION

According to the present invention an electrical contact brush mounting includes brush retaining means for receiving brush means and movable abutment means to bear against said brush means. Constant force coil spring means are mounted with an inner coiled end housed within a cavity in said movable abutment means, an outer extending end being fixed relative to the brush retaining means. The movable abutment means and coil spring means are so arranged as to be capable of providing a force to bias said brush means onto a commutator or slip ring with which the mounting is associated when in use. The spring means to preferably of the type in which the coil material is of thin elongated section, and wound such that the coils have oppositely facing flat surfaces.

Preferably the abutment means is a contact member of cylindrical shape and the cavity for the coiled end of the spring means is of arcuate section on an axis parallel to or coaxial with the axis of the contact member, access to the cavity being through an opening in the cylindrical wall of the contact member.

A characteristic of constant force coil springs is that the diameter of the coil remains substantially constant. It is convenient therefore to form the cavity on a radius slightly larger than the normal radius of the coil of the spring and to form the opening, into the cavity, with a width less than the normal diameter of the coil. Preferably the width of the cavity opening should not be substantially less than the normal diameter of the coil, so that the coil can be easily sprung into the cavity. It is envisaged, however, that the opening into the cavity could be in the form of a narrow slot, in which case, to assemble the spring and contact member together, the coiled end of the spring would be opened out and the spring fed longitudinally through the slot, the end of the spring automatically coiling up within the cavity. Thus once the coiled end of the spring has been located within the cavity, the spring and contact member will normally be held together.

Other advantages and objects of the present invention will be apparent from the following description with reference to the accompanying drawing in which:

DESCRIPTION OF DRAWING

FIG. 1 is an end elevation of an electrical contact brush assembly with certain parts shown in section, FIG. 2 is a side elevation of the assembly shown in FIG. 1, and FIG. 3 is a perspective view of the assembly shown in FIG. 1.

Referring to the drawing, the brush mounting includes brush retaining means in the form of a brush box 1 in which brush means comprising a split brush 2 is slidably housed. The brush 2 is in two halves 3, 4 and at their lower ends project from the box 1 to bear against the commuatator or slip ring of the electrical machine in which the mounting is used. At their top ends the brush halves 3, 4 also project from the box 1 and at their adjacent top corner edges each half is formed with an arcuate cut-out to define a semi-cylindrical channel 5. It is to be noted that the adjacent inner top edges of the brush halves 3, 4, resulting from the formation of the arcuate cut-outs are cut back to provide a V-shaped notch 6.

Abutment means in the form of a cylindrical contact member 10 lies in the channel 5 and along the opening of the notch 6. The radius of the contact member 10 is slightly less than the radius of the semi-cylindrical groove 5. The semi-cylindrical channel 5 may be sprayed with copper or silver to improve the electrical contact between the contact member 10 and the brush halves 3 and 4. The contact member 10 extends substantially along the full length of the channel 5 on the top end of the brush halves 3 and 4. In a central zone of the cylindrical contact member 10, a segment is hollowed out to form a cavity 12 which opens at 13 onto a flat surface 11. The cavity 12 has an arcuate section on an axis parallel to or coaxial with the major axis of the cylindrical member 10. The transverse width of the opening 13 of the cavity 12 onto the flat surface 11 is less than the diameter of the cavity 12.

Preferably, at least one side of the flat surface 11 is arranged at an angle of 45° to the horizontal so that it can be substantially parallel to the uncoiled part of a constant force coil spring 21, thereby ensuring that the uncoiled part of the spring 21 does not rub against the contact member, particularly at points adjacent the opening 13.

An inner coiled end 20 of the spring 21 is located within the cavity 12. It is to be noted that the normal radius of the coil 20 is slightly less than the radius of the cavity 12. Thus once the coil 20 has been squeezed or snapped into the cavity it will remain in the cavity unless forcibly removed. The material of the spring 21 is preferably of thin elongated section and wound such that the coils have oppositely facing flat surfaces.

An outer extending end 22 of the spring 21 is anchored to flexible clip means, in particular to one arm of an inverted U clip 23 which is releasably mounted to the brush box 1. In this regard the clip 23 is provided with spring lugs 24 which engage one on either side of an ear 25 extending from the brush box 1.

A pair of flexible conductors 30 are attached to the cylindrical conductor 10 and lead away from the brush mounting. Conveniently these conductors are made of braided copper.

The coil spring 21 applies a constant force through the cylindrical conductor 10 on the top ends of the two halves 3, 4 of the split brush 2. As wear at the bottom ends of the brush halves takes place they move down the brush box 1 and the spring 21, at its inner end progressively coils up upon itself.

When the halves of the split brush have been worn to such an extent that they have to be replaced, the captive inverted U clip 23 is first released from the ear 25 and removed from brush box 1 carrying the coil spring 21 and cylindrical conductor 10 with it. The worn brush halves can then be picked out of the brush box and replaced with new halves, and the U clip 23 refitted. It will be appreciated that when the U clip 23 together with the spring 21 is removed, the cylindrical conductor 10 does not fall from the spring because of the engagement of the coil end 20 of the spring 21 in the cavity 12.

The conducting cylinder 10 may be made of a metal, for example, brass plated with silver to give good electrical contact but it may be made of carbon if desired. It is not essential for the conductor 10 to be of cylindrical shape but this is a convenient shape to employ because it does assist in ensuring an equal distribution of force on the two halves 3 and 4 of the split brush 2. The cross-sectional shape of the channel 5 need not necessarily be semi-cylindrical but advantageously it is semi-cylindrical if a cylindrical conductor is used. The depth of the channel 5 can vary to suit particular requirements but it should be deep enough to hold the conductor 10 properly located on the top end of the brush.

In the foregoing description a split brush having two halves has been described. The present invention can be used with a brush which is split into 2, 3, 4 or more parts or one which has a single piece body. The invention can be used with a flexless brush wherein the flexible conductors 30 are attached to the contact member 10, or with a brush wherein a flexible conductor is attached to the brush by conventional means such as tamping.

In a further embodiment the coiled end of the spring 21 is electrically insulated from the contact member 10 by applying a thin coating of an insulating material such as insulating varnish, to the walls of the cavity 12. The spring 21 is also insulated from the arm of the U-clip 23 either by applying a thin coating of insulating varnish to the wall of the U-clip, or by inserting a thin insulating packing piece between the contact faces of the outer extending end 22 and the U-clip. The insulation helps to prevent electrical contact between the spring 21 and the contact member 10, thereby diminishing heat build-up in the coiled spring due to minor electrical circuits being set up with the contact member 10.

What is claimed is:

1. In an electrical contact brush assembly including brush retaining means for receiving brush means and movable abutment means for said brush means, the improvement comprising movable abutment means having interior walls defining a cavity, constant force coil spring means including an inner coiled end and an outer extending end, said inner coiled end being retained in said cavity, anchoring means, said outer extending end being fixed to said anchoring means whereby said constant force coil spring means biases said abutment means to urge said brush means into operative engagement with conductor means with which said electrical contact brush assembly is associated.

2. The invention according to claim 1 wherein said constant force coil spring means is a coil spring the material of which is of thin elongated section, the coils of said coil spring having oppositely facing flat surfaces.

3. The invention according to claim 2 wherein said interior walls of said abutment means defining said cavity are of arcuate cross-section in a plane transverse to the coils of said inner coiled end of said coil spring.

4. The invention according to claim 3 wherein the radius of said arcuate cross-section is slightly larger than the normal radius of said inner coiled end of said coil spring.

5. The invention according to claim 4 wherein an opening is defined by an outer surface of said abutment means, said opening communicating with said cavity defined by said interior walls of said abutment means, the width of said opening being less than the normal diameter of said inner coiled end of said coil spring.

6. The invention according to claim 5 wherein said abutment means is a cylindrical body.

7. The invention according to claim 6 wherein said opening in said abutment means is formed in a flat surface across said cylindrical body.

8. The invention according to claim 7 wherein said flat surface is formed at an angle whereby friction between said outer extending end of said coil spring and said cylindrical body is substantially avoided.

9. The invention according to claim 1 wherein said abutment means is conductive and arranged to make electrical contact with said brush means.

10. The invention according to claim 9 wherein said interior walls of said abutment means are electrically insulated from said inner coiled end of said coil spring.

11. An electrical contact brush mounting comprising brush retaining means for receiving brush means, abutment means having interior walls defining a cavity in said abutment means, an outer surface of said abutment means defining an opening therein in communication with said cavity, a constant force coil spring wound with oppositely facing flat coil surfaces, said coil spring having an inner coiled end and an outer extending coiled end, said inner coiled end being retained in said cavity, anchoring means securable to said brush retaining means, said outer extending end extending from said opening and being fixed to said anchoring means, the width of said opening being less than the normal diameter of said inner coiled end, whereby said constant force coil spring means biases said abutment means to urge said brush means into operative engagement with conductor means with which said electrical contact brush mounting is associated.

12. An electrical contact brush mounting according to claim 11 wherein said anchoring means comprises flexible clip means releasably mounted on said brush retaining means.

13. An electrical contact brush mounting according to claim 12 wherein said flexible clip means if a U-clip, said U-clip having limbs straddling said abutment means, said limbs being releasably securable in slotted extensions on opposite sides of said brush retaining means, said outer extending end of said coil spring being fixed to one of said limbs.

14. An electrical contact brush assembly according to claim 13 wherein said abutment means is a cylindrical body, the interior walls of said body defining a cavity of arcuate cross-section in a plane transverse to the coils of said inner coiled end of said coil spring.

15. An electrical contact brush assembly according to claim 14 wherein the radius of said arcuate cross-section is slightly larger than the normal radius of said inner coiled end of said coil spring.

16. An electrical contact brush assembly according to claim 15 wherein said opening in said abutment means is formed in a flat surface across the curved surface of said cylindrical body.

17. An electrical contact brush assembly as claimed in claim 16 wherein said interior walls of said cylindrical body are electrically insulated from said inner coiled end of said coil spring.

References Cited

UNITED STATES PATENTS

| | | | |
|---|---|---|---|
| 2,579,565 | 12/1951 | Giambonini | 310—246 |
| 2,862,124 | 11/1958 | Huber | 310—246 |
| 3,133,218 | 5/1964 | Harris | 310—242 |

MILTON O. HIRSHFIELD, Primary Examiner

L. L. SMITH, Assistant Examiner